(12) United States Patent
Xu et al.

(10) Patent No.: US 8,767,817 B1
(45) Date of Patent: Jul. 1, 2014

(54) APPARATUS AND METHOD FOR CODING USING PARAMETERIZED EQUATION

(75) Inventors: Yaowu Xu, Mountain View, CA (US); Paul Wilkins, Cambridge (GB); James Bankoski, Wynantskill, NY (US)

(73) Assignee: Google Inc., Mountain View, CA (US)

( * ) Notice: Subject to any disclaimer, the term of this patent is extended or adjusted under 35 U.S.C. 154(b) by 293 days.

(21) Appl. No.: 13/081,540

(22) Filed: Apr. 7, 2011

(51) Int. Cl.
H04N 7/12 (2006.01)
H04N 11/02 (2006.01)
H04N 11/04 (2006.01)

(52) U.S. Cl.
USPC .......................................................... 375/240

(58) Field of Classification Search
USPC .......................................................... 375/240
See application file for complete search history.

(56) References Cited

U.S. PATENT DOCUMENTS

| | | | |
|---|---|---|---|
| 5,150,209 A | 9/1992 | Baker et al. |
| 5,708,473 A | 1/1998 | Mead |
| 5,930,387 A | 7/1999 | Chan et al. |
| 5,956,467 A | 9/1999 | Rabbani et al. |
| 6,005,625 A | 12/1999 | Yokoyama |
| 6,021,213 A | 2/2000 | Helterbrand et al. |
| 6,108,383 A | 8/2000 | Miller et al. |
| 6,285,801 B1 | 9/2001 | Mancuso et al. |
| 6,314,208 B1 | 11/2001 | Konstantinides et al. |
| 6,473,460 B1 | 10/2002 | Topper |
| 6,611,620 B1 | 8/2003 | Kobayashi et al. |
| 6,621,867 B1 | 9/2003 | Sazzad et al. |
| 6,654,419 B1 | 11/2003 | Sriram et al. |
| 6,785,425 B1 | 8/2004 | Feder et al. |
| 6,798,901 B1 | 9/2004 | Acharya et al. |
| 6,807,317 B2 | 10/2004 | Mathew et al. |
| 7,054,367 B2 | 5/2006 | Oguz et al. |
| 7,088,351 B2 | 8/2006 | Wang |
| 7,106,910 B2 | 9/2006 | Acharya et al. |
| 7,116,830 B2 | 10/2006 | Srinivasan |
| 7,158,681 B2 | 1/2007 | Persiantsev |
| 7,197,070 B1 | 3/2007 | Zhang et al. |
| 7,277,592 B1 | 10/2007 | Lin |
| 7,333,544 B2 | 2/2008 | Kim et al. |

(Continued)

FOREIGN PATENT DOCUMENTS

JP 267414 10/2007

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003.

(Continued)

*Primary Examiner* — Dave Czekaj
*Assistant Examiner* — Berteau Joisil
(74) *Attorney, Agent, or Firm* — Young Basile Hanlon & MacFarlane P.C.

(57) ABSTRACT

Disclosed herein is a method for encoding a video signal having at least one frame with at least one block of pixels. The method includes selecting a parameterized equation corresponding to a coding mode for a current block of pixels to be encoded in the at least one frame, determining at least one parameter for use in the selected parameterized equation, generating, for at least a first pixel in the current block, a predicted value using the parameterized equation; a position value for the first pixel using a processor; and the determined at least one parameter and encoding the block using the predicted value.

20 Claims, 7 Drawing Sheets

(56) References Cited

U.S. PATENT DOCUMENTS

| | | | |
|---|---|---|---|
| 7,447,337 B2 | 11/2008 | Zhang et al. | |
| 7,466,774 B2 | 12/2008 | Boyce | |
| 7,492,823 B2 | 2/2009 | Lee et al. | |
| 7,602,851 B2 | 10/2009 | Lee et al. | |
| 7,689,051 B2 | 3/2010 | Mukerjee | |
| 7,809,059 B2 | 10/2010 | Yin et al. | |
| 7,924,918 B2 * | 4/2011 | Lelescu et al. | 375/240.12 |
| 2002/0017565 A1 | 2/2002 | Ju et al. | |
| 2003/0053708 A1 | 3/2003 | Kryukov et al. | |
| 2003/0053711 A1 | 3/2003 | Kim | |
| 2003/0202705 A1 | 10/2003 | Sun | |
| 2004/0001634 A1 | 1/2004 | Mehrotra | |
| 2004/0196902 A1 | 10/2004 | Faroudja | |
| 2005/0180500 A1* | 8/2005 | Chiang et al. | 375/240 |
| 2005/0185715 A1 | 8/2005 | Karczewicz et al. | |
| 2005/0259729 A1 | 11/2005 | Sun | |
| 2005/0271140 A1 | 12/2005 | Hanamura et al. | |
| 2006/0013315 A1 | 1/2006 | Song | |
| 2006/0215751 A1 | 9/2006 | Reichel et al. | |
| 2007/0036354 A1 | 2/2007 | Wee et al. | |
| 2007/0080971 A1 | 4/2007 | Sung | |
| 2007/0110152 A1 | 5/2007 | Lee et al. | |
| 2007/0121100 A1 | 5/2007 | Divo | |
| 2007/0217701 A1 | 9/2007 | Liu et al. | |
| 2008/0212678 A1 | 9/2008 | Booth et al. | |
| 2008/0260042 A1 | 10/2008 | Shah et al. | |
| 2008/0298472 A1 | 12/2008 | Jain et al. | |
| 2009/0161763 A1 | 6/2009 | Rossignol et al. | |
| 2009/0257492 A1 | 10/2009 | Andersson et al. | |
| 2010/0021009 A1 | 1/2010 | Yao | |
| 2010/0034265 A1 | 2/2010 | Kim et al. | |
| 2010/0034268 A1 | 2/2010 | Kusakabe et al. | |
| 2010/0111182 A1* | 5/2010 | Karczewicz et al. | 375/240.16 |
| 2010/0195715 A1 | 8/2010 | Liu et al. | |
| 2011/0033125 A1 | 2/2011 | Shiraishi | |
| 2011/0069890 A1 | 3/2011 | Besley | |

OTHER PUBLICATIONS

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Park, Jun Sung, et al., "Selective Intra Prediction Mode Decision for H.264/AVC Encoders", World Academy of Science, Engineering and Technology 13, (2006).

* cited by examiner

APPARATUS AND METHOD FOR CODING USING PARAMETERIZED EQUATION

TECHNICAL FIELD

The present invention relates in general to video encoding and decoding.

BACKGROUND

Digital video is used for various purposes including, for example, remote business meetings via video conferencing, high definition video entertainment, video advertisements, and sharing of user-generated videos. As digital video applications evolve, users have higher expectations for video quality and expect high resolution video even when transmitted over communications channels having limited bandwidth.

To permit higher quality transmission of video while limiting bandwidth consumption, a number of video compression schemes are noted including formats such as VPx, promulgated by Google Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

These compression schemes use different techniques to achieve compression. For example, many of these schemes use prediction techniques to predict where information contained in a portion of a first frame or first region of a frame can be found in a second frame or second frame region. The difference between the prediction and the portion of data in the second frame or second region is calculated to form a residual. One type of prediction, known as intra prediction, can be obtained from data within a current frame. Another type of prediction, known as inter prediction can be obtained from data in previously coded frames. Prediction techniques can have a significant impact on compression. More accurate predictions can result in a smaller residual (i.e. less data), which in turn can lead to better compression. Conversely, less accurate predictions can result in a larger residual (i.e. more data), which can lead to poor compression.

Some intra prediction techniques, for example, copy samples (or filtered samples) from adjacent, previously coded blocks to predict the values in the current block. In some instances, this process may not be suitable to provide the best compression.

SUMMARY

Embodiments of a method for encoding a video signal having at least one frame with a plurality of blocks including a current block are disclosed herein. In one embodiment, the method includes selecting a parameterized equation for the current block and determining at least one parameter for use in the selected parameterized equation. The method also includes generating, for at least a first pixel in the current block, a predicted value using the parameterized equation, a position value for the first pixel, and the determined at least one parameter using a processor. Further, the method includes encoding the current block using the predicted value.

Embodiments of a method for encoding a video signal having at least one frame with a plurality of blocks each having pixels are also disclosed herein. In one embodiment, the method includes selecting a current block of pixels to be encoded in the at least one frame and selecting a parameterized equation representative of a best-fit curve to a set of previously coded pixels in the at least one frame. The method also includes determining at least one parameter for use in the selected parameterized equation. Further, the method includes generating, for at least a first pixel in the current block, a predicted value using the parameterized equation, a position value for the first pixel and the determined at least one parameter using the processor. The method also includes encoding the block using the predicted value.

Embodiments of an apparatus for encoding a video signal having at least one frame with a plurality of blocks including a current block are also disclosed herein. In one embodiment, the method includes a memory a processor configured to execute instructions stored in the memory to select a parameterized equation for the current block and determine at least one parameter for use in the selected parameterized equation. The process is also configured to execute instructions stored in the memory to generate, for at least a first pixel in the current block, a predicted value using the parameterized equation, a position value for the first pixel, and the determined at least one parameter.

Further, embodiments of a method for decoding a video signal having at least one frame with at least one block of pixels are disclosed herein. In one embodiment, a coding mode is received from the video signal for a current block of pixels to be decoded in the at least one frame. The coding mode is used to select a parameterized equation from a set of parameterized equations. At least one parameter is determined for use in the selected parameterized equation. The parameter is derived at least in part from previously coded pixel values. A predicted value is generated, for at least a first pixel in the current block, a predicted value using the parameterized equation; a position value for the first pixel; and the determined at least one parameter. The block is decoded using the predicted value.

These and other embodiments will be described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
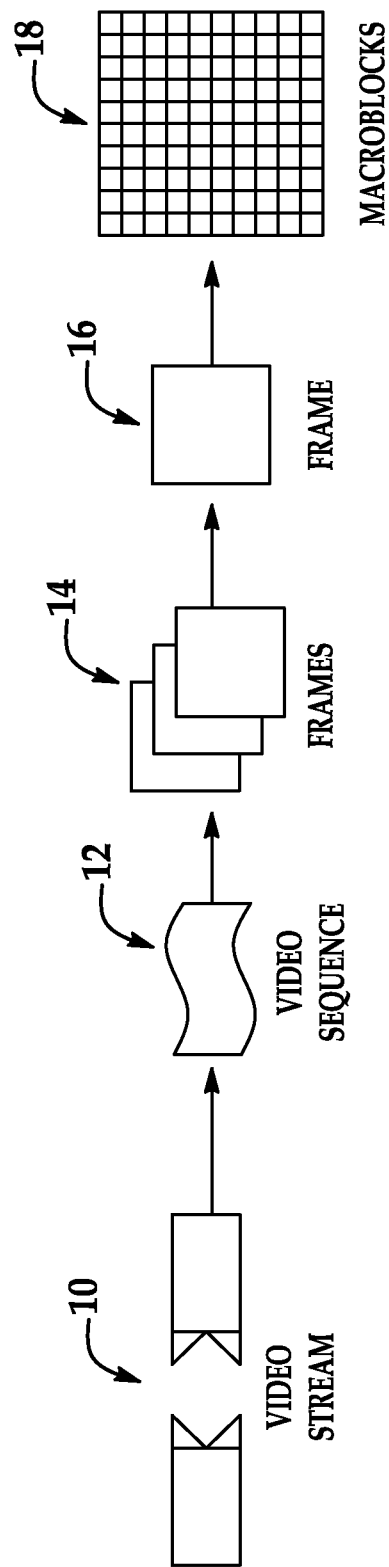
FIG. 1 is a diagram of a video bitstream.

FIG. 1 is a diagram of a video bitstream 10 to be encoded and decoded. Video coding formats, such as VP8 or H.264, provide a defined hierarchy of layers for video stream 10. Video stream 10 includes a video sequence 12. At the next level, video sequence 12 consists of a number of adjacent frames 14, which can be further subdivided into a single frame 16. At the next level, frame 16 can be divided into a series of macroblocks 18, which contain data corresponding to, for example, a 16×16 block of displayed pixels in frame 16. Each macroblock 18 can contain luminance and chrominance data for the corresponding pixels. Macroblocks 18 can also be of any other suitable size such as 16×8 pixel groups or 8×16 pixel groups.

Figure 2:
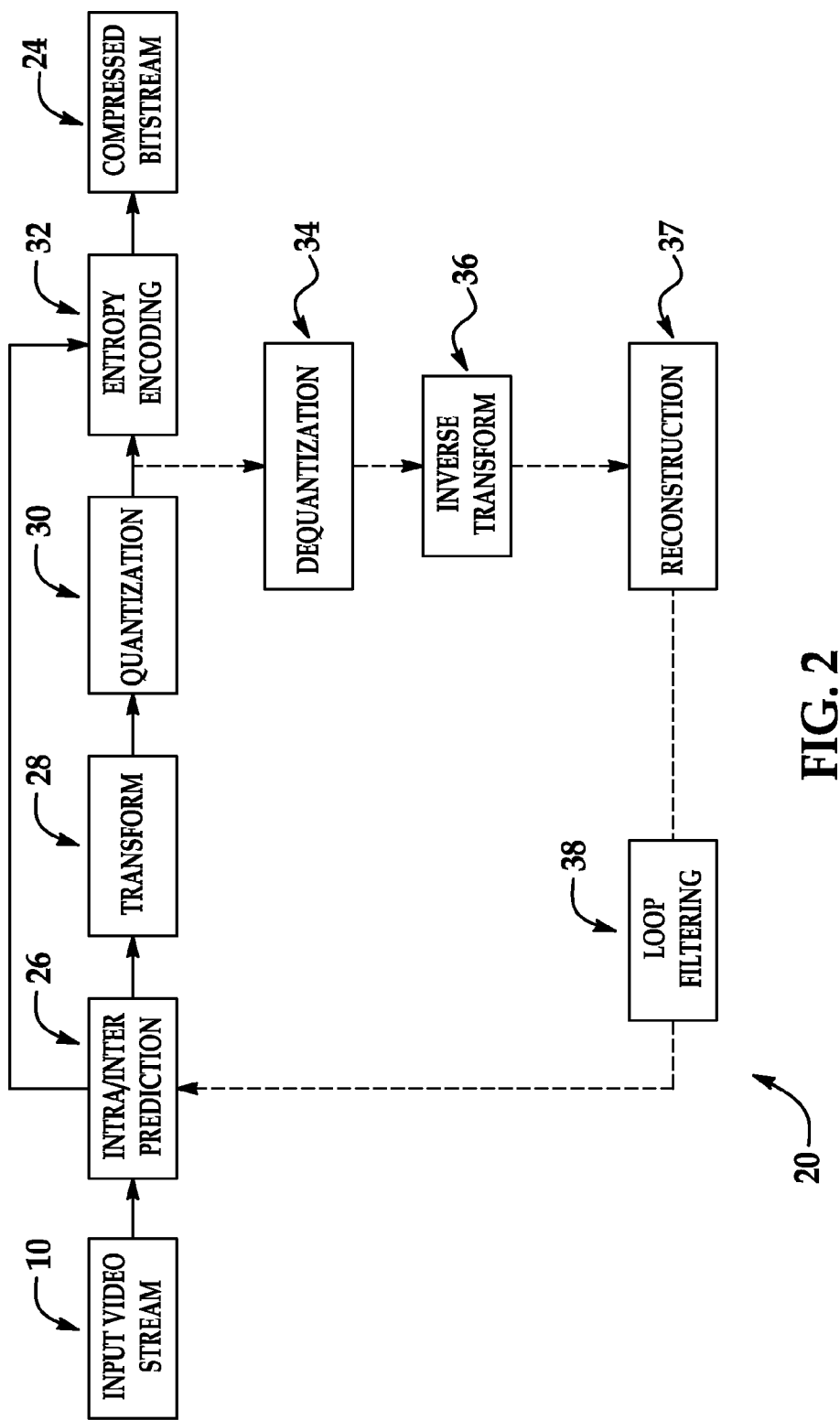
FIG. 2 is a block diagram of a video compression system in accordance with one embodiment.

FIG. 2 is a block diagram of a video compression system in accordance with one embodiment. An encoder 20 encodes an input video stream 10. Encoder 20 has the following stages to perform the various functions in a forward path (shown by the solid connection lines) to produce an encoded or compressed bitstream 24: an intra/inter prediction stage 26, a transform stage 28, a quantization stage 30 and an entropy encoding stage 32. Encoder 20 also includes a reconstruction path (shown by the dotted connection lines) to reconstruct a frame for encoding of further macroblocks. Encoder 20 has the following stages to perform the various functions in the reconstruction path: a dequantization stage 34, an inverse transform stage 36, a reconstruction stage 37 and a loop filtering stage 38. Other structural variations of encoder 20 can be used to encode bitstream 24.

When input video stream 10 is presented for encoding, each frame 16 within input video stream 10 is processed in units of macroblocks 18. At intra/inter prediction stage 26, each macroblock can be encoded using either intra prediction or inter prediction. In either case, a prediction macroblock can be formed. In the case of intra-prediction, a prediction macroblock can be formed from samples in the current frame that have been previously encoded and reconstructed. In the case of inter-prediction, a prediction macroblock can be formed from samples in one or more previously constructed reference frames as described in additional detail herein.

Next, still referring to FIG. 2, the prediction macroblock can be subtracted from the current macroblock at stage 26 to produce a residual macroblock (residual). Transform stage 28 transforms the residual into transform coefficients, and quantization stage 30 quantizes the transform coefficients to provide a set of quantized transform coefficients. The quantized transform coefficients are then entropy encoded by entropy encoding stage 32. The entropy encoded coefficients, together with the information required to decode the macroblock, such as the type of prediction used, motion vectors and quantizer value, are output to compressed bitstream 24.

The reconstruction path in FIG. 2 is present to ensure that both the encoder and the decoder use the same reference frames to decode the macroblocks. The reconstruction path performs functions similar to functions that take place during the decoding process that are discussed in more detail below. These functions can include dequantizing the transform coefficients at a dequantization stage 34 and inverse transforming the dequantized transform coefficients at an inverse transform stage 36 to produce a derivative residual macroblock (derivative residual). At reconstruction stage 37, the prediction macroblock that was predicted at prediction stage 26 can be added to the derivative residual to create a reconstructed macroblock. A loop filter 38 can then be applied to the reconstructed macroblock to reduce blocking distortion.

Other variations of encoder 20 can be used to encode compressed bitstream 24. For example, a non-transform based encoder can quantize the residual signal directly without transform stage 28. In another embodiment, an encoder may have quantization stage 30 and dequantization stage 34 combined into a single stage. The operation of encoding can be performed in many different ways and can produce a variety of encoded data formats. The above-described embodiments of encoding may illustrate some exemplary encoding techniques. However, in general, encoding is understood to mean any transformation of data from one form to another that may or may not include compression, reversibility, or loss of data.

Figure 3:
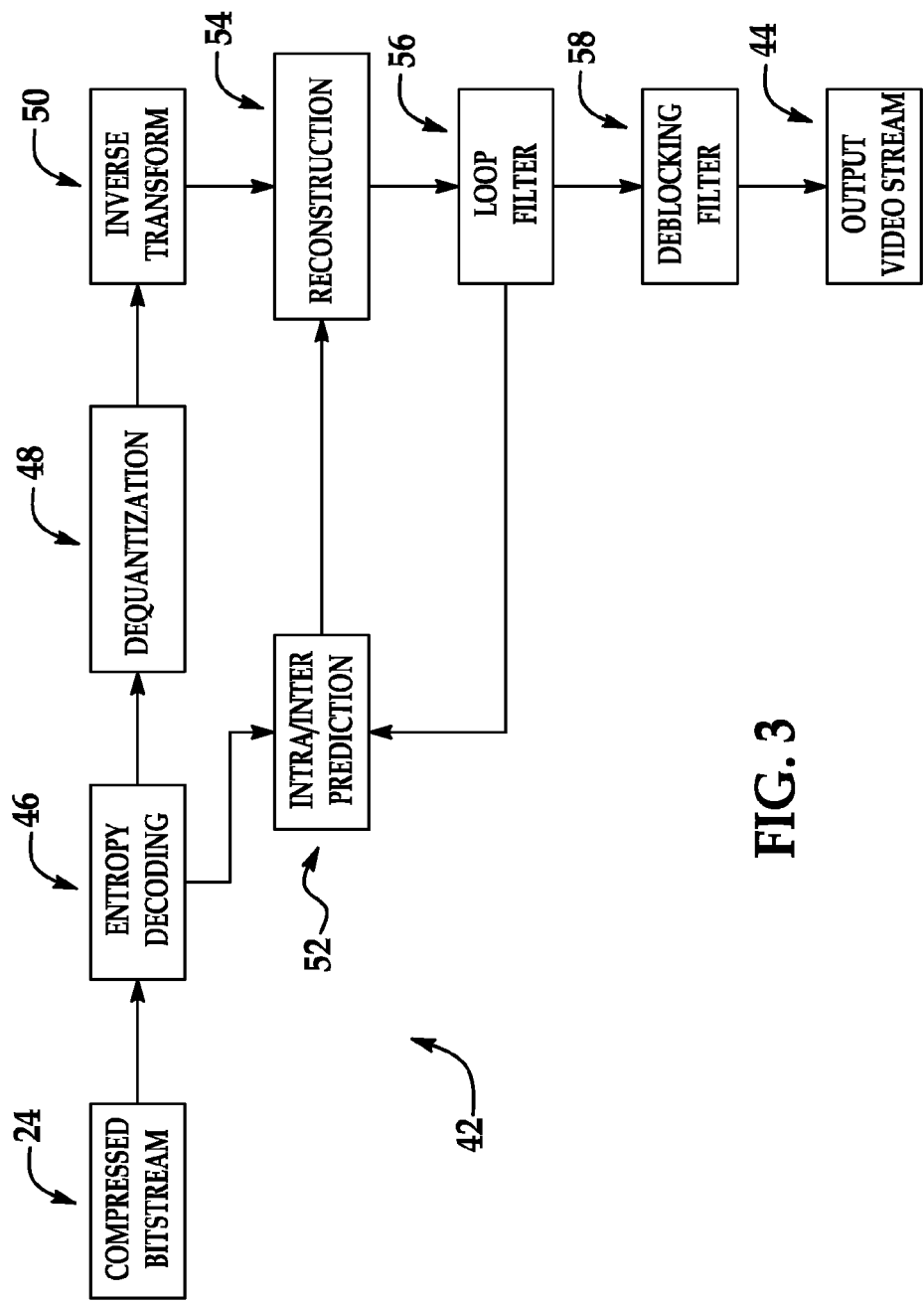
FIG. 3 is a block diagram of a video decompression system in accordance with another embodiment.

FIG. 3 is a block diagram of a video decompression system or decoder 42 to decode compressed bitstream 24. Decoder 42, similar to the reconstruction path of the encoder 20 discussed previously, has the following stages to perform various functions to produce an output video stream 44 from compressed bitstream 24: entropy decoding stage 46, dequantization stage 48, inverse transform stage 50, intra/inter prediction stage 52, reconstruction stage 54, loop filter stage 56 and deblocking filtering stage 58. Other structural variations of decoder 42 can be used to decode compressed bitstream 24.

When compressed bitstream 24 is presented for decoding, the data elements within bitstream 24 can be entropy decoded by entropy decoding stage 46 (using for, for example, Context Adaptive Binary Arithmetic Coding) to produce a set of quantized transform coefficients. Dequantization stage 48 dequantizes the transform coefficients, and inverse transform stage 50 inverse transforms the dequantized transform coefficients to produce a derivative residual that can be identical to that created by the reconstruction stage in the encoder 20. Using header information decoded from the compressed bitstream 24, at intra/inter prediction stage 52, decoder 42 creates the same prediction macroblock as was created in encoder 20. At reconstruction stage 54, the prediction macroblock can be added to the derivative residual to create a reconstructed macroblock. Loop filter 56 can be applied to the reconstructed macroblock to reduce blocking artifacts. Deblocking filter 58 can be applied to the reconstructed macroblock to reduce blocking distortion, and the result is output as output video stream 44.

Other variations of decoder 42 can be used to decode compressed bitstream 24. For example, a decoder may produce output video stream 44 without deblocking filtering stage 58.

Figure 4:
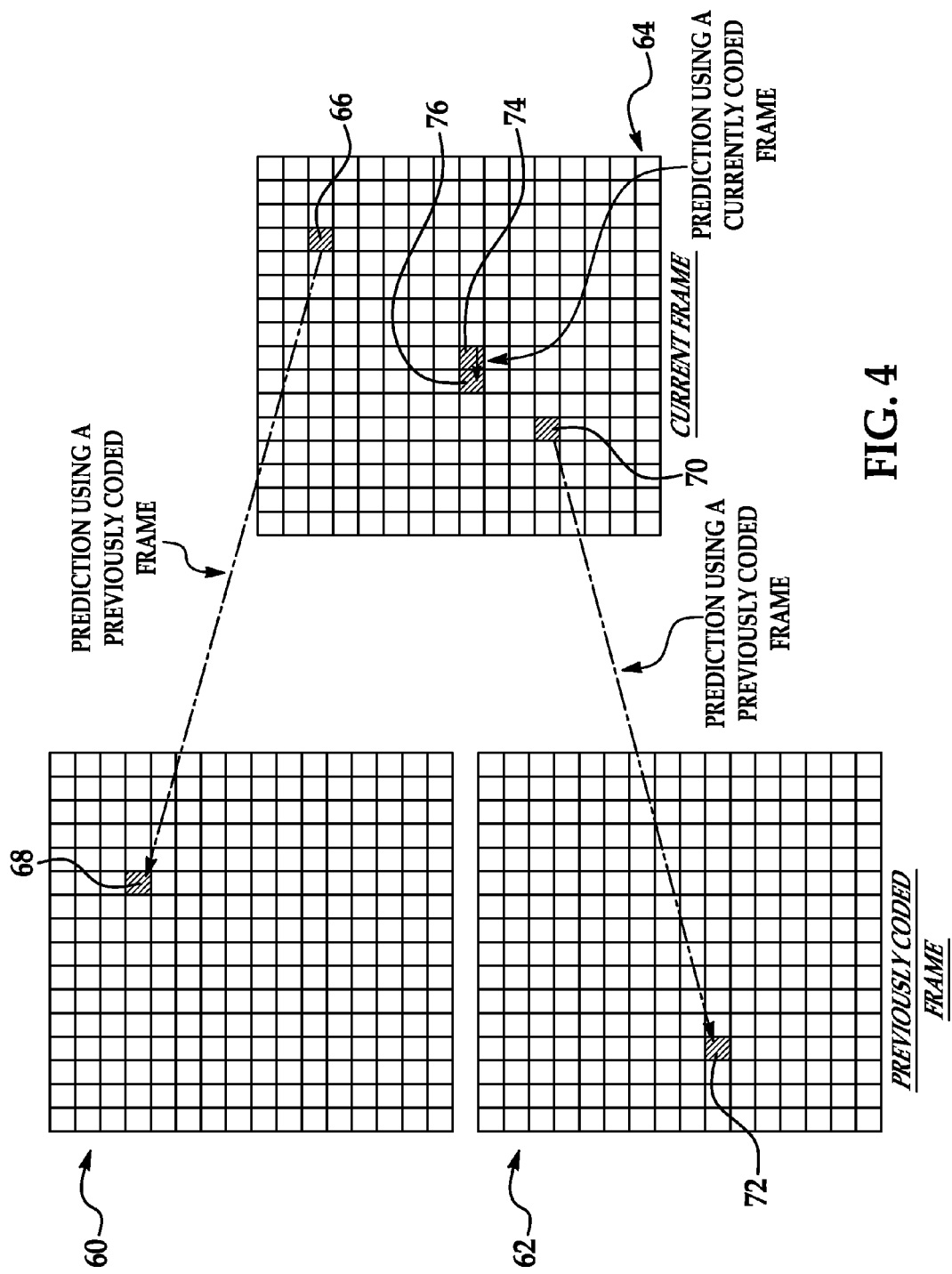
FIG. 4 is a schematic diagram of intra-prediction and inter-prediction modes used in the video compression and decompression systems of FIGS. 2 and 3.

FIG. 4 is a schematic diagram of intra prediction and inter prediction modes. As illustrated, FIG. 4 shows reference frames 60, 62 and a current frame 64 that is currently being encoded or decoded. As discussed previously, each frame can be processed in units of macroblocks at intra/inter prediction stage 26 or intra/inter prediction stage 52 and each macroblock can be coded using either intra prediction, inter prediction or some combination of inter prediction and intra prediction. For example, a current macroblock 66 is shown being encoded or decoded using inter prediction from a macroblock 68 from previously coded reference frame 60. Similarly, a current macroblock 70 is shown being encoded or decoded using inter prediction from a macroblock 72 from previously encoded reference frame 62. Also, for example, a current macroblock 74 is shown being encoded or decoded using intra prediction from a macroblock 76 within current frame 64.

More specifically, intra prediction can use already coded macroblocks within a current frame (e.g. current frame 64) to approximate the contents of a current macroblock (e.g. current macroblock 74). Already coded macroblocks can include any number of macroblocks relative to a current macroblock. For example, with respect to current macroblock 74, the already-coded macroblocks can include all macroblocks in rows above current macroblock 74 together with macroblocks in the same row as, and to the left of current macroblock 74. Intra prediction can apply to intra coded macroblocks in an inter frame (i.e. a frame encoded with reference to prior frames) or to intra coded macroblocks in an intra frame (i.e. a frame encoded without reference to any other frame).

Encoder 20 and decoder 42 can process various image formats. For example, an 8-bit per sample YUV 4:2:0 image format may be used. In a YUV format, Y is a luma block and U and V are chroma blocks. Any other image format may also be used (e.g. 4:4:4, 4:2:2, etc.). Accordingly, using the 4:2:0 image format, each macroblock, can be a square array of pixels whose Y dimensions are 16×16 pixels and whose U and V dimensions are 8×8 pixels. Each macroblock can also be divided into 4×4 pixel subblocks. Of course, other suitable divisions of macroblocks (or another sized block) are also available.

Hereafter, the embodiments will be described using the term blocks which includes macroblocks as described previously. Blocks, like macroblocks, can be of any suitable size.

The type of intra prediction performed on a block can be, for example, determined by the type of intra prediction mode selected for that block. The chroma (U and V) and luma (Y) components of the block can be calculated independently of each other. For example, predictions for the U and V components of current block can be calculated identically using the same relative addressing and arithmetic. However, in other embodiments, predictions for the U and V components may be calculated differently.

Accordingly, intra predictions can be performed on the chroma component (e.g., 8×8), the luma component (e.g. 16×16) or any other suitable block or component according to one or more coding modes. Coding modes relay how intra predictions are formed for a given block. As discussed previously, some current techniques for intra prediction formulate a prediction by copying samples (or filtered samples) from adjacent, previously coded blocks to predict the values in the current block. For example, a chroma component may be intra predicted using one of four prediction modes such as vertical prediction, horizontal prediction, DC prediction or True Motion prediction. Similarly, a luma component may be predicted using vertical prediction, horizontal prediction, DC prediction or True Motion prediction. Other prediction modes are also available (e.g. southwest prediction, southeast prediction, vertical right diagonal prediction, vertical left diagonal prediction, horizontal down prediction, horizontal up prediction, etc.).

Rather than copying pixel values, embodiments of the present invention perform intra prediction for a current block of pixels using one or more parameterized equations. These parameterized equations can, for example, be an expression representing a curve that has a "best fit" to a defined set of previously coded pixel values.

The expression that has the best fit may be an approximate fit to the previously coded pixel values or an exact fit. To find the best fit, the previously coded pixel values can be used to estimate or determine one or more parameters for use in the parameterized equation. Since these embodiments involved the use of intra prediction, the previously coded pixel values are in the same frame as the current frame being decoded. Once the parameterized equation (s) has been formulated (i.e. parameters have been determined), it can be used to generate predicted values for the current block.

Further, determinations of which previously coded values of pixels to use in the current frame can be selected by a particular coding mode predefined in the encoder and decoder. For example, if a coding mode selected to encode the current block indicates that the two rows immediately above the current block will be used to estimate parameters, the decoder can use the same previously coded pixel values (i.e. the two rows immediately above the current block) to decode the current block. If there is a second coding mode (associated with another parameterized equation), the second coding mode may dictate that only a row immediately to the left of the current block may be used to estimate the parameters. Although these embodiments describe a predefined set of previously coded pixels for each coding mode, in other embodiments, the set can be determined dynamically by the encoder or decoder. In other embodiments, the encoder may transmit the set of previously coded pixels to the decoder.

Figure 5:
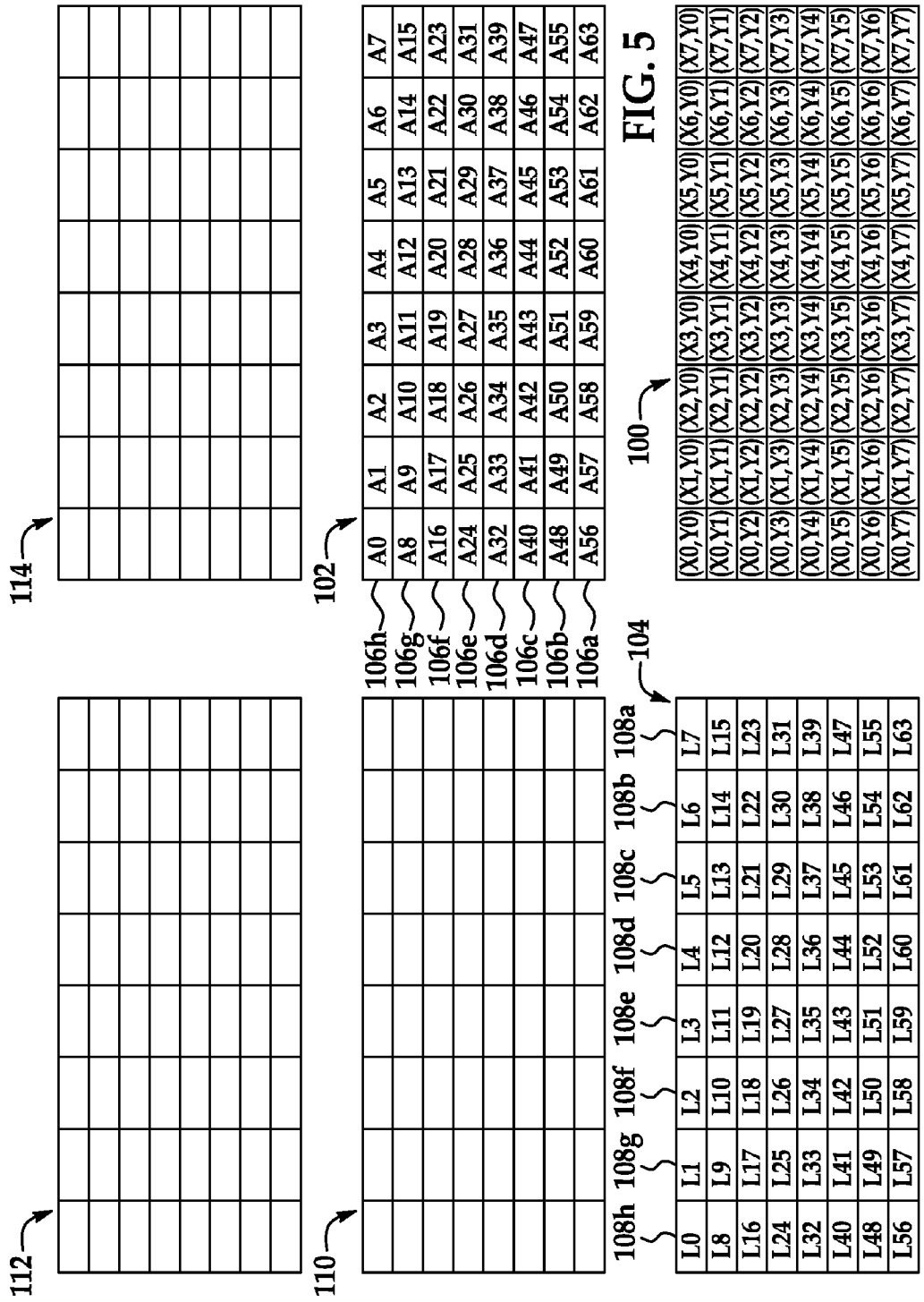
FIG. 5 is a schematic diagram of previously coded blocks and a current block to be coded in the video compression and decompression systems of FIGS. 2 and 3.

FIG. 5 illustrates an example of a current block 100, an above block 102 and a left block 104. Current block 100, above block 102 and left block 104 are each an 8×8 block of pixels. Above block 102 and left block 104 contain a set of previously coded pixel values A0-A63 and L0-L63, respectively. Previously coded pixel values are those that have been previously encoded and reconstructed (or decoded) and are therefore available to the encoder or decoder to form a prediction reference. Above block 102 includes 8 rows 106*a-h* with each row containing 8 previously coded pixel values (e.g. row 106*a* includes pixel values A56-A63). Similarly, left block 104 includes 8 columns (108*a-h*) with each column containing 8 previously coded pixel values (e.g. column 108*a* includes pixel values L7, L15, L23, L31, L39, L47, L55 and L63). As will be discussed below, embodiments may use all or some of these previously coded pixel values in above block 102 and/or left block 104.

Further, although the examples described herein refer to using previously coded pixel values of above block 102 and left block 104, other previously coded pixel values in the frame being decoded may be used. For example, previously coded pixel values in an above-left block 110 may be used. Also, the previously coded pixel values may be in a block that is non-adjacent to block 100. For example, previously coded pixel values in blocks 112 and 114, which are non-adjacent to block 100 may also be used to form a prediction reference.

Intra prediction according to the embodiments described herein can be performed on each of the pixels in current block 100. Each pixel in current block 100 is represented by a position value. The position value can be x-y coordinates and can be denoted as "($X_n$, $Y_m$)". Thus, for example, the pixel in the upper-left corner of current block 100 can have a position value of ($X_0$, $Y_0$). The ($X_0$, $Y_0$) position value may, in one example, be equivalent to the coordinates (0, 0), but the position value may have any suitable numerical value. Additionally, although the origin for the x and y coordinates associated with each pixel is defined at the upper-left pixel of current block 100 in this example, the origin may be located at any other location. For example, the origin can be defined as the lower-right pixel of current block 100. Further, in other embodiments, the position value is not represented by x and y coordinates. For example, each pixel's position value can be represented by an angle and a distance from an origin. Other suitable representations of the position value are also available.

Figure 6:
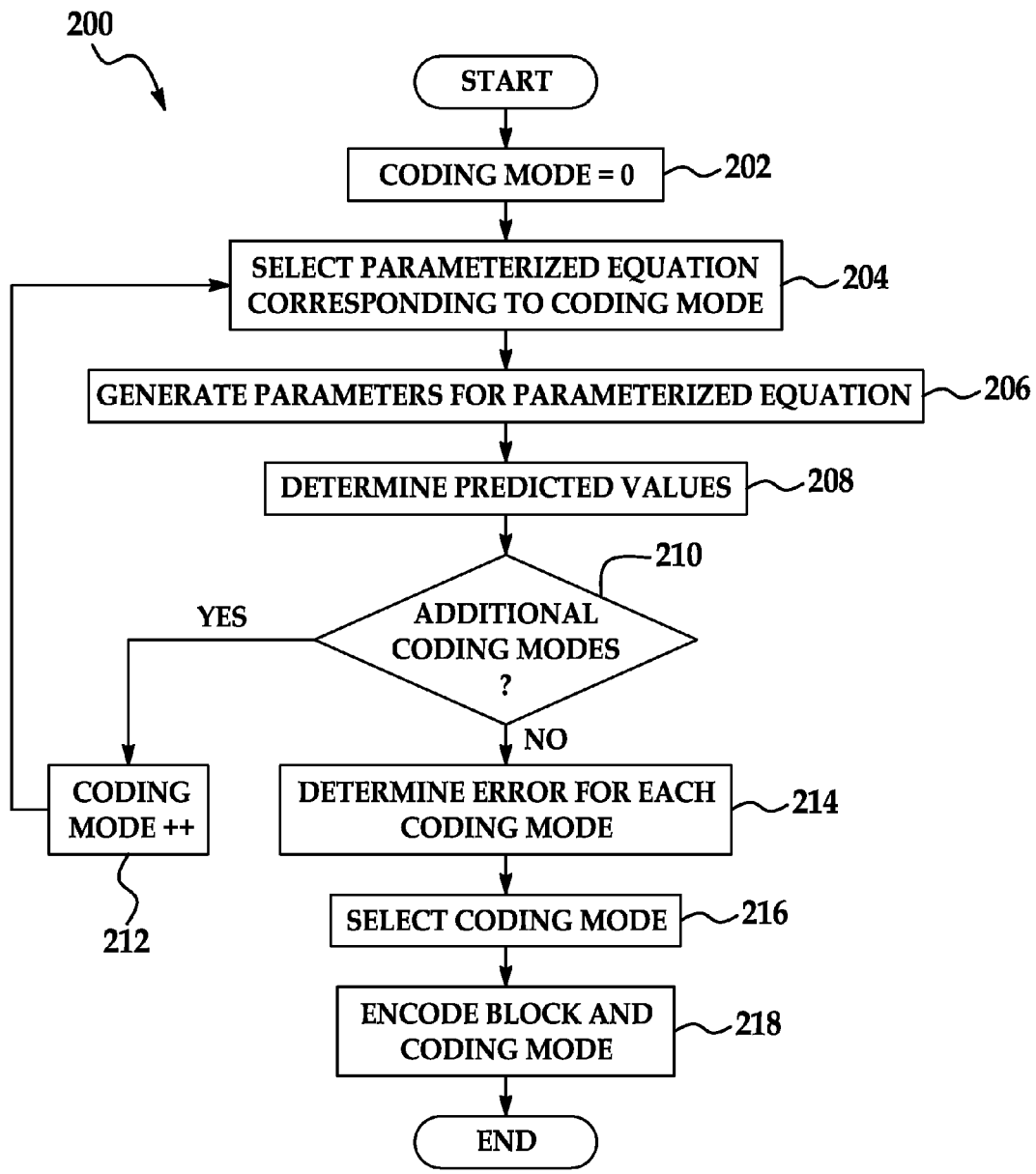
FIG. 6 is an exemplary process of encoding using a parameterized equation for use by the video compression system of FIG. 2.

FIG. 6 illustrates one exemplary process 200 for generating and encoding predicted values for current block 100. Initially in process 200, a coding mode is initialized to 0 (202). A coding mode can be associated with a parameterized equation. Once the coding mode is initialized, a parameterized equation based on the coding mode can be selected (204). For example, in one instance, the parameterized equation associated with a coding mode can be selected from the following set of polynomial equations:

| CODING MODE | PARAMETERIZED EQUATION |
| --- | --- |
| Mode 0: | $I(x, y) = p0 * x * x + p1 * x * y + p2 * y * y + p3 * x + p3 * y + p5;$ |
| Mode 1: | $I(x, y) = p0 * x + p1 * y + p2;$ |
| Mode 2: | $I(x, y) = p0 * x * x + p1 * x * y + p2 * y * y + p3 * x + p3 * y + p5;$ |
| Mode 3: | $I(x, y) = p0 * x + p1 * y + p2;$ and |
| Mode 4: | $I(x, y) = p0 * x * x + p1 * x + p2;$ wherein | x is the x coordinate of the pixel;
y is the y coordinate of the pixel;
p0-p5 are parameters (i.e. coefficient values); and
I(x,y) is the predicted value for the pixel as a function of the pixel's x and y coordinate position.

Thus, for example, if the coding mode is equal to 0 then the equation for "Mode 0" is selected. The set of equations can include only one parameterized equation (e.g. only Mode 3) or other parameterized equations in addition to or in lieu of those listed above. As listed above, the set includes five polynomial equations each having variables x and y (i.e. x and y coordinates) and coefficients p0-p5 (parameters). The coefficients for each of the parameters are not necessarily equal. For example coefficient p0 in mode 0 is not necessarily the same as coefficient p0 in mode 3.

Other parameterized equations are also available and do not necessarily have to be polynomial equations. For example, the parameterized equation may be an exponential equation. The parameterized equation can include any combination of coefficients, variables, functions, operators, factorials, summations, derivatives, integrals and/or any other suitable mathematical symbol. There may be multiple solutions to the parameterized equation or one solution. The solutions may be exact values or be estimates.

After the equation has been selected according to the coding mode, parameters are generated for use in the parameterized equation (206). The parameters can be generated or estimated from a set of prior coded pixels such that the parameterized equation is representative of a best fit curve to a set of previously coded pixels in the frame being coded. In other words, the parameter can be generated so that the parameterized equation represents a curve with a minimal deviation from the set of previously coded pixels. The set of previously coded pixels can be any suitable pixels in the current frame being encoded. For example, the set can be row 106a-c in above block 102. In another example, the set can be column 108 of left block 104. However, the set of previously coded pixels is not limited to defined rows or columns and can be any suitable number and location of pixels.

One exemplary technique for generating these parameters is, for example, least squares estimation. This technique considers the best-fit curve as the curve that has the minimal sum of the deviations squared (least square error) from a given set of data (i.e. the set of previously coded pixels). An example of this technique is described in "Linear Regression Analysis: Theory and Computing" published in 2009 and written by Xin Yan and Xiaogang Suat.

Another exemplary technique is to calculate the parameters directly using the defined set of previously coded pixel values. Each parameter can be an average of some of the previously coded pixel values such that the parameterized equation fits exactly or closely through the points. Other suitable techniques for finding the parameters are also available.

After the parameters have been calculated, control then moves to block 208 to determine the predicted values can be determined for the parameterized equation (208). The predicted values are those that are subtracted from a current block to form a residual. The predicted values can be determined by finding the solution (i.e. I(x,y)) for each of the pixels as a function of their x and y coordinates. Returning to FIG. 5, for example, each of the 64 pixels in current block 100 will have an associated predicted value as a function of their x and y coordinates input into the parameterized equation.

Once the predicted values have been determined, process 200 determines if there are any additional coding modes (210). For example, in the listing of the parameterized equations above, there are a total of 5 coding modes (Mode 0-Mode 4), although any number of coding modes is possible. Encoder 20 analyzes the results of each of the coding modes to determine which coding mode provides the best coding efficiency for current block 100. If there are additional coding modes to be analyzed, the current coding mode incremented (212) and the process returns to determine the predicted values (as described above) for the parameterized equation associated with the next coding mode (204).

If there are no additional coding modes, an error is determined for coding with each coding mode (214). In other words, the coding mode that, for example, provides the best prediction (i.e. the least number of bits in the residual) can be indicated as the coding mode with the least error. This error can be calculated using the Sum of Absolute Errors (SAE). After the error have been determined, one of coding modes is selected (216). For example, the coding mode that gives the smallest SAE (i.e. best coding efficiency) can be the coding mode that is selected for current block 100. However, the coding mode can be selected based on any other suitable factor in addition to or in lieu of SAE.

After the coding mode has been selected (216), the prediction can be subtracted from the block to form the residual and the residual can be encoded (218). Further, the coding mode itself is also encoded so that decoder can decode the block according to the same coding mode (218). However, the values of the parameters do not have to be transmitted as the decoder will be able to generate the parameters according to the same techniques as the encoder (e.g. least squares estimation). Thus, it is unnecessary to encode and transmit the parameters along with the residual and coding mode.

Figure 7:
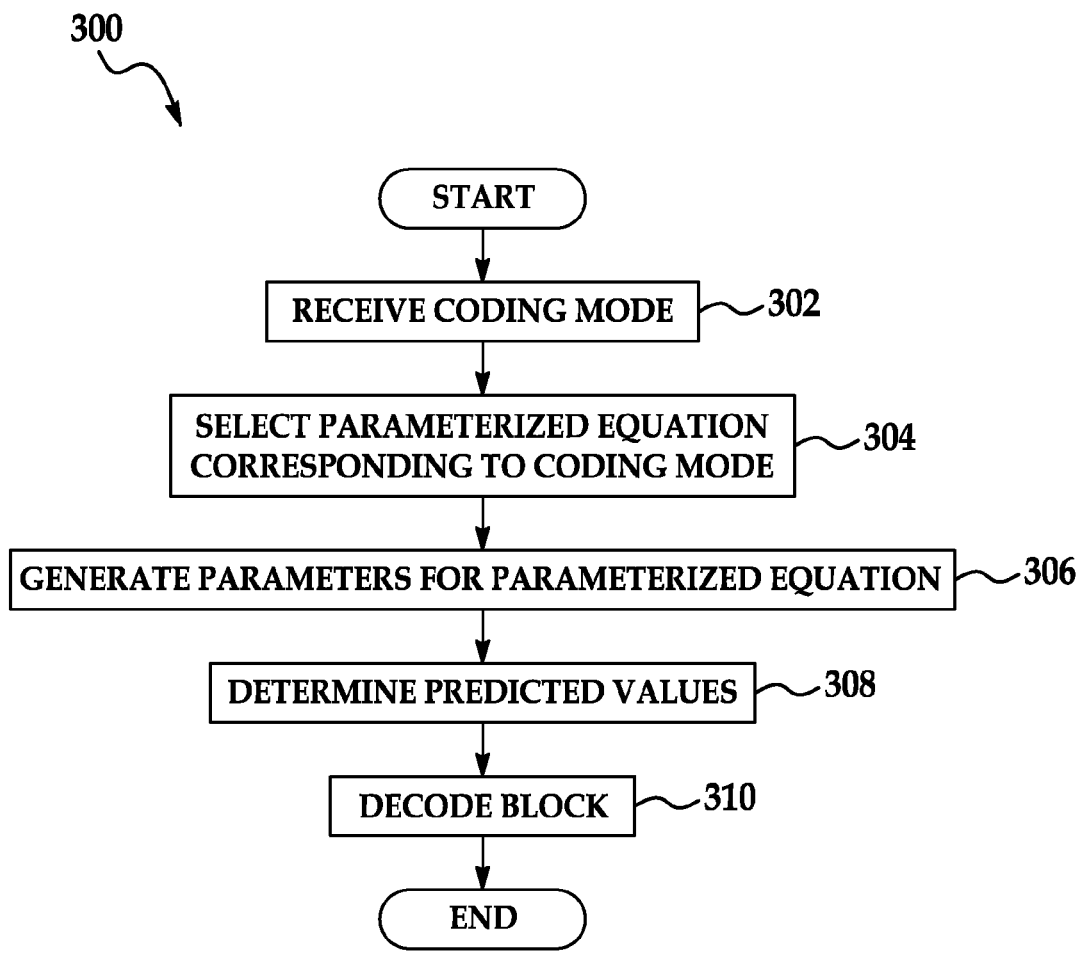
FIG. 7 is an exemplary process of decoding using a parameterized equation for use by the video compression system of FIG. 2.

FIG. 7 illustrates one exemplary process 300 for generating and decoding predicted values for current block 100. To decode current block 100, decoder 42 can receive the coding mode that was transmitted in the bitstream (302). The coding mode can then be used to determine a corresponding parameterized equation (304). For example, if Mode 1 is received, as listed in the exemplary list of equations above, equation "I(x,y)=p0*x+p1*y+p2" is selected. Once the parameterized equation is known, the parameters can be generated or estimated in the same manner in which they were in the encoder (306). Thus, for example, if the encoder had generated the parameters using the set of previously coded pixel values in rows 106a-106c using the technique of least squares estimation, the decoder would generated the parameters in the same manner. After the parameters have been generated (306), predicted values for the parameterized equation can be determined (308) similar to that described in the encoder above. The predicted values can be determined by calculating the solution for each of the pixels as a function of their x and y coordinates. Once the predicted values have been determined, block 100 can be decoded by decoder 42 (310). In other words, the decoded residual can be added to the predicted values to form the reconstructed block.

In another embodiment, any other intra prediction technique (e.g. DC prediction, Vertical prediction, etc.) may be used in conjunction with the coding modes and parameterized equations described above. Referring to the preceding example, if Modes 0-4 each correspond to a parameterized equation, an additional Mode 5 can correspond to intra prediction using, for example DC prediction. Any other intra prediction technique that formulates a prediction by copying samples (i.e. a copying mode) from previously coded blocks to predict the values in the current block may be used. Encoder 20 can calculate the error for coding with each of these coding modes (including Coding Mode 5) and can select a coding mode as described previously in steps 214 and 216 of FIG. 6.

The above-described embodiments of encoding or decoding may illustrate some exemplary encoding techniques. However, in general, encoding and decoding as those terms are used in the claims are understood to mean compression, decompression, transformation or any other change to data whatsoever.

Encoder 20 and/or decoder 42 are implemented in whole or in part by one or more processors which can include computers, servers, or any other computing device or system capable of manipulating or processing information now-existing or hereafter developed including optical processors, quantum processors and/or molecular processors. Suitable processors also include, for example, general purpose processors, special purpose processors, IP cores, ASICS, programmable logic arrays, programmable logic controllers, microcode, firmware, microcontrollers, microprocessors, digital signal processors, memory, or any combination of the foregoing. In the claims, the term "processor" should be understood as including any the foregoing, either singly or in combination. The terms "signal" and "data" are used interchangeably.

Encoder 20 and/or decoder 42 also include a memory, which can be connected to the processor through, for example, a memory bus. The memory may be read only memory or random access memory (RAM) although any other type of storage device can be used. Generally, the processor receives program instructions and data from the memory, which can be used by the processor for performing the instructions. The memory can be in the same unit as the processor or located in a separate unit that is coupled to the processor.

For example, encoder 20 can be implemented using a general purpose processor with a computer program that, when executed, carries out any of the respective methods, algorithms and/or instructions described herein. In addition or alternatively, for example, a special purpose processor can be utilized which can contain specialized hardware for carrying out any of the methods, algorithms and/or instructions described herein. Portions of encoder 20 or decoder 42 do not necessarily have to be implemented in the same manner. Thus, for example, intra/inter prediction stage 26 can be implemented in software whereas transform stage 28 can be implemented in hardware. Portions of encoder 20 or portions of decoder 42 may also be distributed across multiple processors on the same machine or different machines or across a network such as a local area network, wide area network or the Internet.

Encoder 20 and decoder 42 can, for example, be implemented in a wide variety of configurations, including for example on servers in a video conference system. Alternatively, encoder 20 can be implemented on a server and decoder 42 can be implemented on a device separate from the server, such as a hand-held communications device such as a cell phone. In this instance, encoder 20 can compress content and transmit the compressed content to the communications device, using the Internet for example. In turn, the communications device can decode the content for playback. Alternatively, the communications device can decode content stored locally on the device (i.e. no transmission is necessary). Other suitable encoders and/or decoders are available. For example, decoder 42 can be on a personal computer rather than a portable communications device.

The operations of encoder 20 or decoder 42 (and the algorithms, methods, instructions etc. stored thereon and/or executed thereby) can be realized in hardware, software or any combination thereof. All or a portion of embodiments of the present invention can take the form of a computer program product accessible from, for example, a computer-usable or computer-readable medium. A computer-usable or computer-readable medium can be any device that can, for example, tangibly contain, store, communicate, and/or transport the program for use by or in connection with any processor. The medium can be, for example, an electronic, magnetic, optical, electromagnetic, or a semiconductor device. Other suitable mediums are also available.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for encoding a video signal having at least one frame with a plurality of blocks including a current block, comprising:
    selecting a parameterized equation for predicting the current block, wherein the parameterized equation includes a polynomial expression with coefficients and variables, wherein the coefficients include the at least one parameter and at least one of the variables is set equal to the position value, and wherein the parameterized equation is selected from a set of equations including at least one of the following equations:

$$I(x,y)=p0*x*x+p1*x*y+p2*y*y+p3*x+p3*y+p5,$$

$$I(x,y)=p0*x+p1*y+p2, \text{ and}$$

$$I(x,y)=p0*x*x+p1*x+p2,$$

wherein $I(x,y)$ is the predicted value, $x$ and $y$ are the variables and $p0$-$p5$ are the coefficients;
    determining at least one parameter for use in the selected parameterized equation;
    generating, for at least a first pixel in the current block, a predicted pixel value using the parameterized equation, a position value for the first pixel, and the determined at least one parameter using a processor; and
    encoding the current block using the predicted pixel value.

2. The method of claim 1, wherein the parameterized equation is representative of a best-fit curve to a set of previously coded pixel values in the at least one frame, and wherein the at least one parameter is determined using a least squares estimation such that the best-fit curve has the minimal sum of deviations squared from the set of previously coded pixel values.

3. The method of claim 1, wherein the position value is a x-y coordinate corresponding to the position of the first pixel within the current block.

4. The method of claim 1, wherein the parameterized equation corresponds to a prediction coding mode.

5. The method of claim 4, wherein the prediction coding mode is included in a set of prediction coding modes, and wherein the set of prediction coding modes includes at least one copying mode indicative of generating prediction values by copying at least one previously coded pixel value.

6. The method of claim 4, wherein encoding further comprises including the prediction coding mode corresponding to the selected parameterized equation.

7. The method of claim 1, wherein selecting the parameterized equation further comprises:
   solving each of a plurality of parameterized equations;
   determining, for each solved parameterized equation, a prediction coding error of the solution relative to at least the first pixel of the current block; and
   selecting the parameterized equation whose solution results in the lowest determined prediction coding error for the current block.

8. The method of claim 1, wherein the at least one parameter is determined using a defined set of previously coded values of pixels in the at least one frame.

9. The method of claim 8, wherein the defined set of previously coded values of pixels are at least one of one or more rows in a block above the current block or one or more columns in a block to the left of the current block.

10. A method for encoding a video signal having at least one frame with a plurality of blocks each having pixels, comprising:
   selecting a current block of pixels to be encoded in the at least one frame;
   selecting a parameterized equation representative of a best-fit curve to a set of previously coded pixels in the at least one frame, wherein the parameterized equation includes a polynomial expression with coefficients and variables, wherein the coefficients include the at least one parameter and at least one of the variables is set equal to the position value, and wherein the parameterized equation is at least one of the following equations:

$$I(x,y)=p0*x*x+p1*x*y+p2*y*y+p3*x+p3*y+p5,$$

$$I(x,y)=p0*x+p1*y+p2, \text{ and}$$

$I(x,y)=p0*x*x+p1*x+p2$, wherein $I(x,y)$ is the predicted value, $x$ and $y$ are the variables and $p0$-$p5$ are the coefficients;

determining at least one parameter for use in the selected parameterized equation;
   generating, for at least a first pixel in the current block, a predicted pixel value using the parameterized equation, a position value for the first pixel, and the determined at least one parameter using a processor; and
   encoding the block using the predicted pixel value.

11. The method of claim 10, wherein the at least one parameter is determined using a least squares estimation such that the best-fit curve has the minimal sum of deviations squared from the set of previously coded pixel values.

12. A method for decoding a video signal having at least one frame with at least one block of pixels, comprising:
   receiving a coding mode from the video signal for a current block of pixels to be decoded in the at least one frame;
   using the coding mode to select a parameterized equation from a set of parameterized equations, wherein the coding mode is used to select the parameterized equation from a set of equations including at least one of the following equations:

$$I(x,y)=p0*x*x+p1*x*y+p2*y*y+p3*x+p3*y+p5,$$

$$I(x,y)=p0*x+p1*y+p2, \text{ and}$$

$I(x,y)=p0*x*x+p1*x+p2$, wherein $I(x,y)$ is the predicted value, $x$ and $y$ are the variables and $p0$-$p5$ are the coefficients;

determining at least one parameter for use in the selected parameterized equation, the parameter derived at least in part from previously coded pixel values;
   generating, for at least a first pixel in the current block, a predicted value using the parameterized equation; a position value for the first pixel; and the determined at least one parameter; and
   decoding the block using the predicted value.

13. The method of claim 12, wherein the parameterized equation is representative of a best-fit curve to a set of previously coded pixel values in the at least one frame, and wherein the at least one parameter is determined using a least squares estimation such that the best-fit curve has the minimal sum of deviations squared from the set of previously coded pixel values.

14. The method of claim 12, wherein the parameterized equation includes a polynomial expression with coefficients and variables, wherein the coefficients include the at least one parameter and at least one of the variables is set equal to the position value.

15. The method of claim 12, wherein the position value is a x-y coordinate corresponding to the position of the first pixel within current block.

16. The method of claim 12, wherein the previously coded values of pixels are at least one of one or more rows in a block above the current block and one or more columns in a block to the left of the current block.

17. The method of claim 12, wherein the coding mode is included in a set of coding modes, and wherein the set of coding modes includes at least one copying mode indicative of generating prediction values by copying at least one previously coded pixel value.

18. The method of claim 1, wherein selecting the parameterized equation includes:
   selecting $I(x,y)=p0*x*x+p1*x*y+p2*y*y+p3*x+p3*y+p5$ as the parameterized equation and estimating p0-p5 based on two rows of pixels from a block above the current block;
   selecting $I(x,y)=p0*x+p1*y+p2$ as the parameterized equation and estimating p0-p2 based on three rows of pixels from a block above the current block;
   selecting $I(x,y)=p0*x*x+p1*x*y+p2*y*y+p3*x+p3*y+p5$ as the parameterized equation and estimating p0-p5 based on two rows of pixels in a block above the current block and two columns of pixels in a block to the left of the current block;
   selecting $I(x,y)=p0*x+p1*y+p2$ as the parameterized equation and estimating p0-p2 based on two columns of pixels from a block to the left of the current block; and
   selecting $I(x,y)=p0*x*x+p1*x+p2$ as the parameterized equation and estimating p0-p2 based on two rows of pixels from a block above the current block.

19. The method of claim 10, wherein selecting the parameterized equation includes:
   selecting $I(x,y)=p0*x*x+p1*x*y+p2*y*y+p3*x+p3*y+p5$ as the parameterized equation and estimating p0-p5 based on two rows of pixels from a block above the current block;
   selecting $I(x,y)=p0*x+p1*+p2$ as the parameterized equation and estimating p0-p2 based on three rows of pixels from a block above the current block;

selecting $I(x,y)=p0*x*x+p1*x*y+p2*y*y+p3*x+p3*y+p5$ as the parameterized equation and estimating p0-p5 based on two rows of pixels in a block above the current block and two columns of pixels in a block to the left of the current block;

selecting $I(x,y)=p0*x+p1*y+p2$ as the parameterized equation and estimating p0-p2 based on two columns of pixels from a block to the left of the current block; and selecting $I(x,y)=p0*x*x+p1*x+p2$ as the parameterized equation and estimating p0-p2 based on two rows of pixels from a block above the current block.

20. The method of claim 12, wherein using the coding mode to select the parameterized equation includes:

selecting $I(x,y)=p0*x*x+p1*x*y+p2*y*y+p3*x+p3*y+p5$ as the parameterized equation and estimating p0-p5 based on two rows of pixels from a block above the current block;

selecting $I(x,y)=p0*x+p1*y+p2$ as the parameterized equation and estimating p0-p2 based on three rows of pixels from a block above the current block;

selecting $I(x,y)=p0*x*x+p1*x*y+p2*y*y+p3*x+p3*y+p5$ as the parameterized equation and estimating p0-p5 based on two rows of pixels in a block above the current block and two columns of pixels in a block to the left of the current block;

selecting $I(x,y)=p0*x+p1*y+p2$ as the parameterized equation and estimating p0-p2 based on two columns of pixels from a block to the left of the current block; and selecting $I(x,y)=p0*x*x+p1*x+p2$ as the parameterized equation and estimating p0-p2 based on two rows of pixels from a block above the current block.

\* \* \* \* \*